(12) United States Patent
Wilson et al.

(10) Patent No.: US 7,811,159 B2
(45) Date of Patent: Oct. 12, 2010

(54) APPARATUS FOR PROVIDING CONVENIENCE SERVICES TO STATIONARY VEHICLES

(75) Inventors: Arnold C. Wilson, Tellico Plains, TN (US); David Everhart, Knoxville, TN (US); John T. Badgett, Lenoir City, TN (US)

(73) Assignee: Convoy Solutions LLC, New York, NY (US)

( * ) Notice: Subject to any disclaimer, the term of this patent is extended or adjusted under 35 U.S.C. 154(b) by 368 days.

(21) Appl. No.: 10/209,519

(22) Filed: Jul. 30, 2002

(65) Prior Publication Data
US 2003/0036346 A1 Feb. 20, 2003

Related U.S. Application Data

(63) Continuation of application No. 09/838,393, filed on Apr. 19, 2001, now Pat. No. 6,482,080, which is a continuation-in-part of application No. 09/496,910, filed on Feb. 2, 2000, now abandoned.

(51) Int. Cl.
*B60H 1/00* (2006.01)
(52) U.S. Cl. .................. 454/119; 454/159; 454/131; 454/132; 454/133; 454/128
(58) Field of Classification Search .............. 454/119, 454/159, 131, 132, 133, 128
See application file for complete search history.

(56) References Cited

U.S. PATENT DOCUMENTS

| | | | |
|---|---|---|---|
| 2,470,799 A | 5/1949 | Ames ........................... 98/2 |
| 2,612,830 A | 10/1952 | Kendrick ....................... 98/2 |
| 2,646,496 A | 7/1953 | Takach ........................ 219/39 |
| 2,683,407 A | 7/1954 | Takach ........................... 98/2 |
| 2,746,372 A | 5/1956 | Smith et al. .................... 98/2 |
| 2,962,951 A | 12/1960 | Holmes ........................ 98/2 |
| 3,211,076 A | 10/1965 | Chancellor et al. ............. 98/2 |
| 3,360,954 A | 1/1968 | Snider et al. ................ 62/259 |
| 3,487,765 A | 1/1970 | Lang ............................. 98/1 |
| 3,637,059 A | 1/1972 | Schmidt ..................... 194/9 T |

(Continued)

FOREIGN PATENT DOCUMENTS

DE  3711116 A1  10/1988

(Continued)

OTHER PUBLICATIONS

*Quickstart Guide PNV*, Connect!, Dec. 2000, www.PNV.com, p. 71.

(Continued)

*Primary Examiner*—Jiping Lu
(74) *Attorney, Agent, or Firm*—Wood, Herron & Evans, LLP

(57) ABSTRACT

An apparatus for providing convenience services to a stationary vehicle independent of the vehicle's electrical system. At least one conduit is attached to a housing for transferring the services to a supply panel. The supply panel includes a face on which the various controls and connectors associated with the supplied convenience services, such as heating, cooling, electrical power, compressed air, computer network communications, telephone, video, and television, are disposed. The supply panel is dimensioned to interface with the stationary vehicle through an opening in the vehicle, such as a window or service door, and includes means for providing a substantially airtight seal for climate control.

25 Claims, 4 Drawing Sheets

U.S. PATENT DOCUMENTS

| | | | |
|---|---|---|---|
| 3,777,506 A | 12/1973 | Hergatt et al. | 62/237 |
| 3,878,886 A | 4/1975 | McIntire, Jr. | 165/29 |
| 4,632,019 A | 12/1986 | Whiteman | 98/1 |
| 5,104,037 A | 4/1992 | Karg et al. | 236/46 |
| 5,279,458 A | 1/1994 | DeWolf et al. | 236/47 |
| 5,386,461 A | 1/1995 | Gedney | 379/102 |
| 5,423,407 A | 6/1995 | Nikolic | 194/217 |
| 5,661,984 A | 9/1997 | Durrell et al. | 62/304 |
| 5,687,573 A | 11/1997 | Shih | 62/3.6 |
| 5,688,306 A * | 11/1997 | Verini | 95/15 |
| 5,748,104 A | 5/1998 | Argyroudis et al. | 340/870.11 |
| 5,816,443 A | 10/1998 | Bustos | 221/211 |
| 5,859,779 A | 1/1999 | Giordano et al. | 364/479.01 |
| 5,926,531 A | 7/1999 | Petite | 379/144 |
| 5,931,012 A | 8/1999 | Robertson | 62/237 |
| 5,957,329 A * | 9/1999 | Kenney et al. | 222/1 |
| 6,044,954 A * | 4/2000 | McLaughlin | 194/241 |
| 6,109,049 A * | 8/2000 | Wetherell | 62/231 |
| 6,147,601 A | 11/2000 | Sandelman et al. | 340/506 |
| 6,160,477 A | 12/2000 | Sandelman et al. | 340/506 |
| 6,181,991 B1 | 1/2001 | Kondo et al. | 701/22 |
| 6,211,782 B1 | 4/2001 | Sandelman et al. | 340/506 |
| 6,241,156 B1 | 6/2001 | Kline et al. | 236/49.3 |
| 6,330,806 B1 | 12/2001 | Beaverson et al. | 62/201 |
| 6,450,411 B1 | 9/2002 | Rash et al. | 236/44 A |
| 6,482,080 B2 * | 11/2002 | Wilson et al. | 454/119 |
| 6,705,938 B2 | 3/2004 | Everhart et al. | 454/119 |
| 2001/0031618 A1 | 10/2001 | Wilson et al. | 454/119 |
| 2001/0048376 A1 | 12/2001 | Maeda et al. | 340/870.17 |
| 2002/0029096 A1 | 3/2002 | Takai et al. | 700/276 |
| 2003/0183232 A1 | 10/2003 | Fukunaga et al. | |

FOREIGN PATENT DOCUMENTS

| | | |
|---|---|---|
| WO | WO 01/56821 | 8/2001 |

OTHER PUBLICATIONS

News, *Park 'N View Completes its 125th Truckstop Installation at TravelCenters of America*, Ontario, CA, Aug. 25, 1998, Business Wire (newswire).

News, *Park'N View, Inc. Secures Financing for National Expansion*, Dec. 9, 1996, News Wire.

United Stated Patent and Trademark Office, *Office Action Summary*, U.S. Appl. No. 10/208,905, Date Mailed Jan. 29, 2003 (11 pages).

United States Patent and Tredmark Office, *Office Action Summary*, U.S. Appl. No. 10/208,905, Date Mailed Jul. 16, 2003 (7 pages).

United States Patent and Trademark Office, *Advisory Action*, U.S. Appl. No. 10/208,905, Date Mailed Sep. 30, 2003 (3 pages).

United States Patent and Trademark Office, *Office Action Summary*, U.S. Appl. No. 10/208,905, Date Mailed Feb. 11, 2004 (6 pages).

United States Patent and Trademark Office, *Office Action Summary*, U.S. Appl. No. 10/700,108, Date Mailed May 24, 2005 (8 pages).

* cited by examiner

APPARATUS FOR PROVIDING CONVENIENCE SERVICES TO STATIONARY VEHICLES

CROSS-REFERENCE TO RELATED APPLICATIONS

The present application is related to U.S. Ser. No. 10/208,905, entitled Apparatus for Providing Convenience Services to Stationary Vehicles, filed Jul. 30, 2002, U.S. Pat. No. 6,705,938, entitled Apparatus for Controlling the Environment of a Parked Vehicle, filed Sep. 11, 2002 and U.S. Ser. No. 10/700,108, entitled Apparatus for Controlling the Environment of a Parked Vehicle, filed Nov. 3, 2003.

This application is a Continuation of U.S. Ser. No. 09/838,393 U.S. Pat. No. 6,482,080, filed Apr. 19, 2001, which is a Continuation-In-Part of U.S. Ser. No. 09/496,910, filed Feb. 2, 2000, now abandoned, each disclosure of which is hereby incorporated by reference herein in its entirety.

STATEMENT REGARDING FEDERALLY SPONSORED RESEARCH OR DEVELOPMENT

Not Applicable.

BACKGROUND OF THE INVENTION

1. Field of Invention

This invention relates to an apparatus for providing convenience services to a stationary vehicle allowing the vehicle to conserve fuel and reduce noise and particulate matter emissions by shutting off the engine. Specifically, the invention relates to a system which provides services such as heating, cooling, electrical, telephone, television, and Internet to a stationary vehicle independent of the vehicle's electrical system.

2. Description of the Related Art

Over-the-road (OTR) drivers spend many hours on the road. The cab of the tractor-trailer often serves as home for days at a time. Accordingly, modern tractor-trailer cabs are well equipped with amenities to make time on the road more enjoyable. The amenities are especially important when considering the regulations imposed upon OTR drivers with regard to the number of hours which may be legally driven between periods of rest. Full sleeper cabs allow the driver to stop and rest without having to leave the tractor-trailer. Often these cabs include televisions and other amenities to make the driver more comfortable. However, these amenities require a power source and, typically, that power source is the electrical system of the tractor-tractor. Accordingly, the engine must be left running during these times. This period of low-idle operation when the tractor-trailer engine runs only to provide power to the amenities, such as basic heating and cooling during sleep periods, has been shown to increase the wear on the engine and result in approximately 60% of all required engine maintenance. By providing these services externally to the tractor-trailer, thereby allowing the engine to be shut off during rest periods, the life of the engine can be improved and fuel consumption reduced. Additionally, by shutting off the engine, the particulate matter (PM-10) emissions and other gaseous pollutants are eliminated which benefits the environment.

Other systems have been developed to provide convenience services to a stationary vehicle. Typical of the art are those devices disclosed in the following U.S. Patents:

| U.S. Pat. No. | Inventor | Issue Date |
|---|---|---|
| 2,612,830 | Kendrick, J. R. | Oct. 7, 1952 |
| 2,646,496 | Takach, S. | Jul. 21, 1953 |
| 2,962,951 | Holmes, R. | Dec. 6, 1960 |
| 3,211,076 | Chancellor, B. A., et al. | Oct. 12, 1965 |
| 3,360,954 | Snider, A. R., et al. | Jan. 2, 1968 |
| 3,777,506 | Hergatt, Robert N., et al. | Dec. 12, 1973 |
| 5,661,984 | Durrell, Mark, et al. | Sep. 9, 1997 |
| 5,687,573 | Shih, Ping-Ho | Nov. 11, 1997 |
| 4,632,019 | Whiteman, Gary D. | Dec. 30, 1986 |

U.S. Pat. No. 2,612,830, issued to Kendrick, discloses an air conditioning and speaker unit that is attached to a vehicle window for use in open air theaters. The unit rests on the partially closed window and contains a heating element with a blower for heating the vehicle interior.

U.S. Pat. No. 2,646,496, issued to Takach, discloses a combination speaker and heater for drive-in theaters. A blower unit with a heater is mounted on the speaker post. A flexible duct connects the blower unit to the speaker unit, which is attached to a window of the automobile. The speaker unit has a port through which the heated air enters the automobile.

U.S. Pat. No. 2,962,951, issued to Holmes, discloses an automobile air conditioning system for drive-in theaters. A central air conditioning unit supplies either heated or cooled air to a plurality of automobiles. Air from the central unit is ducted to hollow posts adjacent to the automobiles. The hollow post has flexible hose connected to it. The opposite end of the flexible hose is adapted to fit between the top of an automobile window and the window frame.

U.S. Pat. No. 3,211,076, issued to Chancellor, et al., discloses an air cooling unit for truck tractors, in which the existing cooling unit for the trailer is ducted to the tractor cab. An electric fan is used to push the cool air into the tractor cab. The duct between the trailer and the tractor is easily removable.

U.S. Pat. No. 3,360,954, issued to Snider, et al., discloses a detachable air conditioner for a parked automobile at a drive-in theater. The air conditioner is mounted on an embedded speaker pole and distributes cooled air through a hose with a terminal end that is solely supported and secured between the window and the window frame of the vehicle. The terminal end includes sliding panels that can be adjusted to the size of the window opening.

U.S. Pat. No. 3,777,506, issued to Hergatt, et al., discloses a portable air conditioner apparatus. Hergatt, et al., teach an air conditioner unit having a head adaptor mounted on vertically adjustable supports that is designed for use with a recreational vehicle (RV) having a substantially vertical and flat surface in which a window is disposed. The head adaptor is placed over an open window of the vehicle and includes a front gasket for creating a seal when pressed against the vertical, flat side of the RV. The head adaptor is held in position against the RV by the weight of the air conditioner unit which must be placed in close proximity to the RV so as to bring the head adaptor unit into contact with the RV.

U.S. Pat. No. 5,661,984, issued to Durrell, et al., discloses an automotive air conditioner. The automotive air conditioner is a portable, self contained evaporative cooling unit which attaches to a window and rests against the door of a vehicle. The non-powered design is suited for use in warm and dry climates. The optional fan for improving air flow is powered by the electrical system of the vehicle or by a solar cell.

U.S. Pat. No. 5,687,573, issued to Shih, discloses a thermal control device for cooling or heating parked vehicles. Shih teaches a portable HVAC unit which is disposed within the vehicle to heat or cool the internal air of the vehicle and exhaust air through a vent passing through the window opening. The unit is powered by the electrical system of the vehicle and includes a timer for scheduling operation to adjust the internal temperature of the vehicle prior to use.

Accordingly, there is a need for an apparatus that can supply convenience services to a stationary vehicle, independent of the vehicle's electrical system. The apparatus should provide a variety of convenience services to make the vehicle hospitable for an extended stop, such as an overnight rest stop, and include basic amenities, such as heating and cooling, telephone services, Internet services, electrical power, and radio/television signals. The apparatus should be usable with a vehicle without the need for extensive retrofit and should provide the substantially airtight seal necessary for climate control.

Therefore, it is an object of the present invention to provide an apparatus for providing convenience services to a stationary vehicle independent of the vehicle electrical system.

It is another object of the present invention to provide an apparatus for providing convenience services to a stationary vehicle which interfaces with a vehicle to provide a substantially airtight fit to allow a climate controlled environment.

It is a further object of the present invention to provide an apparatus for providing convenience services to a stationary vehicle which universally fits various vehicle configurations without the need for expensive retrofit interfaces.

It is a still further object of the present invention to provide an apparatus for providing convenience services to a stationary vehicle which is designed to connect to the vehicle through a standard interface.

BRIEF SUMMARY OF THE INVENTION

An apparatus for providing convenience services to stationary vehicles independent of the vehicle electrical system is provided allowing the engine of the stationary vehicle to be stopped, thereby reducing the amount of low-idle operation. The apparatus (services module) includes a stationary housing which provides a connection point for the various services to be provided. At least one positionable conduit is attached to the stationary housing for transferring the services to a supply panel, which is releasably attached to the stationary vehicle.

The stationary housing contains the air conditioning equipment and acts as a through-point for the other services. The electrical power, telephone, network, and television wiring, which pass through the housing into the conduit arm, are brought into the stationary housing from an outside source. The outside source may be a central panel which switches and distributes the services between and among several stationary housings.

The conduit includes an outside hose, an inside hose, and cables run either through the inside hose or between the inside and outside hose. Supply air traverses one hose and return air the other. The cables include the electrical cables for providing services to the supply panel.

The supply panel provides an interface for the convenience services, including the air supply, electrical power receptacles, telephone receptacles, computer network receptacle, television signal connector, and card reader. In addition to the card reader, the supply panel has a keyboard and display interface. The supply panel also has means for sealing the panel to the vehicle. One embodiment uses an inflatable bladder surrounding the periphery of the panel, the bladder expands to seal the supply panel in an opening in the vehicle. Another embodiment has the panel fitted with a template, which is sized to fit into an opening in the vehicle, typically an open window. Another embodiment has the panel mounted to an adapter, which fits into a receptacle in the vehicle.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for providing convenience services to stationary vehicles independent of the vehicle electrical system is disclosed. The illustrated embodiment shows the apparatus, or services module, providing services to over-the-road trucks. Those skilled in the art will recognize that vehicles other than trucks may utilize the services module without departing from the spirit and scope of the present invention.

Figure 1:
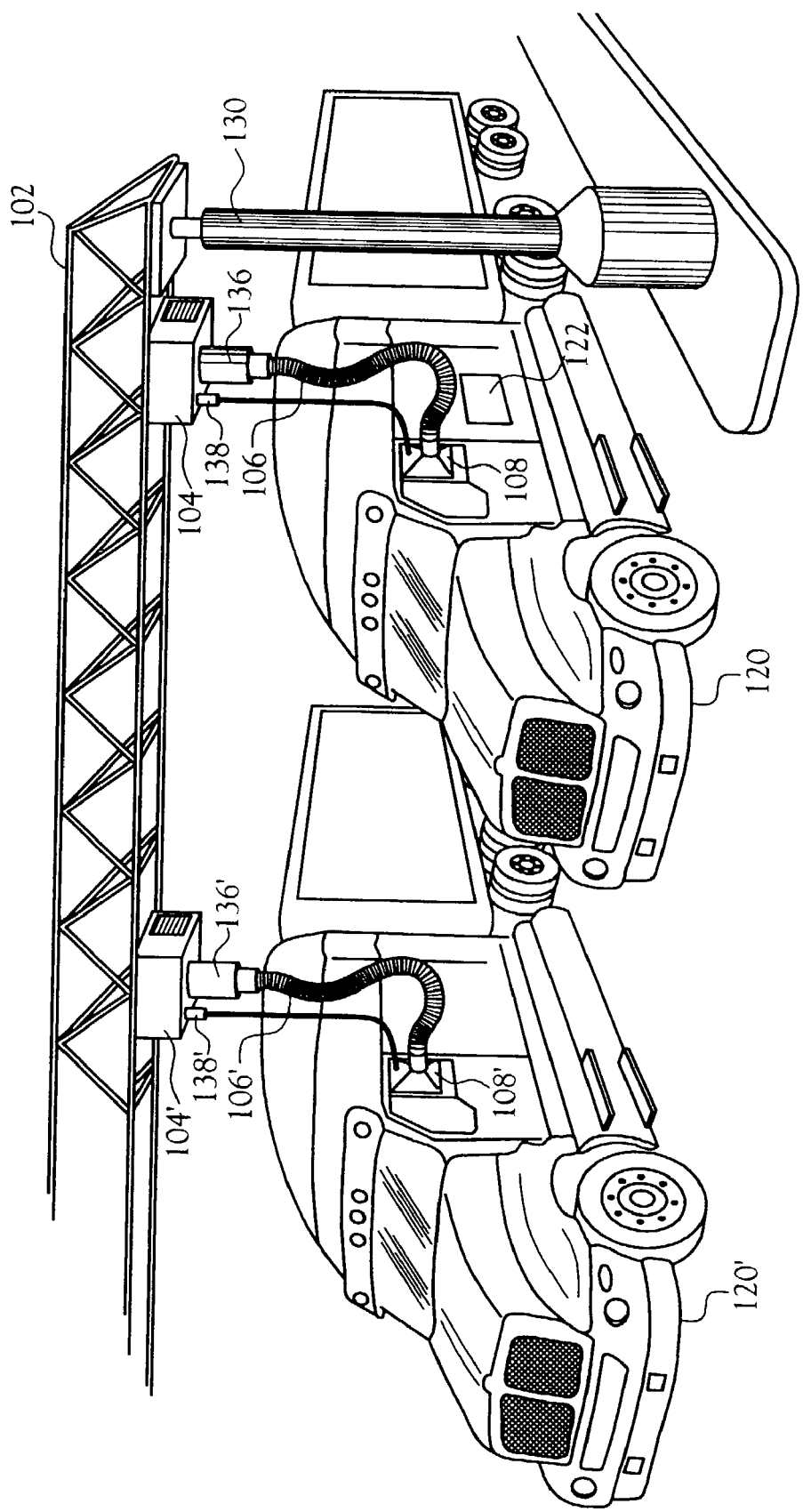
FIG. 1 is a perspective view of a truck parking lot with an overhead gantry, to which the stationary housing is fixed.

FIG. 1 shows two trucks parked under an overhead gantry 102. Multiple stationary housings 104 are attached to the gantry 102. Descending from each stationary housing 104 is a strain relief 136 and a conduit 106 attached to a supply panel 108, which is positioned in a window of a stationary vehicle 120 and provides a substantially airtight seal for climate control. The conduit 106 is bendable to a selected elevation and orientation so as to accommodate vehicles 120 of various sizes. Also descending from the stationary housing 104 is a support cable 138, which is attached to the supply panel 108.

FIG. 1 shows the gantry 102 supported on one end by post 130. Those skilled in the art will recognize that the overhead means for supporting the stationary housing 104 can vary without departing from the spirit and scope of the present invention. For example, the horizontal gantry 102 could be a roof or roof truss, and the post 130 could be replaced by a building, wall, or other structure capable of supporting the gantry 102.

Figure 2:
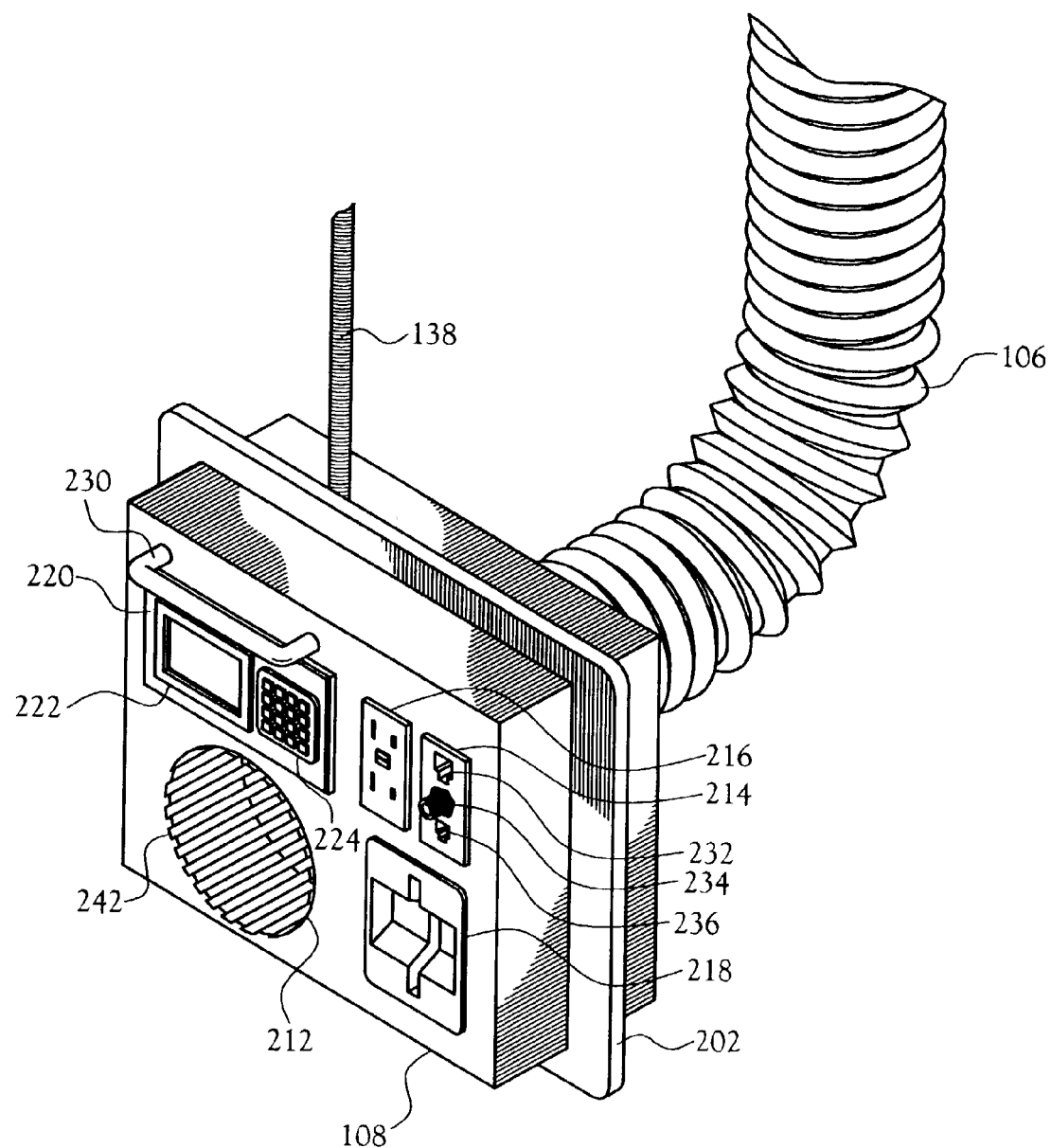
FIG. 2 is a perspective view of the supply panel.

FIG. 2 shows the various services available from the portion of the supply panel 108 that extends into the vehicle 120. The illustrated embodiment shows a conditioned air discharge vent 212, a communications services sub-panel 214, an electrical outlet sub-panel 216, a card reader 218, and a keypad 224 and display 222 forming an operator interface sub-panel 220. The keypad 224 is an array of switches, which can be actuated to produce a desired result. The conditioned air discharge vent 212 has louvers 242 that can be rotated to direct the air flow in various directions as it enters the vehicle 120. The return air vent (not seen in FIG. 2) is located on the bottom of the supply panel 108, adjacent to the template 202. The communications services sub-panel 214 has a telephone jack receptacle 236, a network jack receptacle 232, and a connector 234 for television, video, and radio signals. The electrical outlet sub-panel 216 has a pair of conventional, nominal 120 VAC power receptacles. The card reader 218 is a conventional card reader that the vehicle operator can use to pay for the services provided by the supply panel 108. The output/indicator sub-panel 222 permits the vehicle operator to interact with the system controlling the supply panel 108 and controlling the convenience services provided to the supply panel 108. The display 222 provides information to the vehicle operator. This information can be in the form of indicating lights, an alphanumeric display, and/or a printer. The information provided can include supply panel status and condition, environmental conditions in the vehicle interior and/or exterior, and a printed receipt. Those skilled in the art will recognize that any combination of the above services, along with other services not mentioned, could be used without departing from the spirit and scope of the present invention. For example, the supply panel 108 could include multiple telephone jack receptacles 236 to allow simultaneous voice and data communications and a 220 volt electrical outlet, in addition to the services described above.

FIG. 2 shows a support cable 138, which permits the weight of the supply panel 108 to be carried by the stationary housing 104. Also shown in FIG. 2 is the supply panel 108 attached to a template 202, which is sized to fit into a window opening of vehicle 120 and provides a substantially airtight seal for climate control. Alternatively, the template 202 can be sized and configured for installation through a service door 122 in the body of the sleeper portion of the vehicle 120. To effectuate a substantially airtight seal, a gasket, typically made of rubber, is attached to the face of the template 202. Once inserted into the service door opening 122, a locking mechanism is engaged to secure the supply panel 108. The locking mechanism is a plurality of locking clips which are extended from the supply panel 108 to engage the inner surface of the vehicle 120. Those skilled in the art will recognize that various methods for securing the supply panel 108 within the service door opening 122 can be used without departing from the spirit and scope of the present invention.

One embodiment for ensuring a substantially airtight seal for climate control uses an inflatable bladder surrounding the supply panel 108. With the bladder deflated, the supply panel 108 is positioned in the vehicle's window opening. The bladder is then inflated, which secures and seals the supply panel 108 in the window opening. The supply panel 108 is generally dimensioned to approximate the dimensions of a window of a stationary vehicle 120. The supply panel 108 is dimensioned for use with a tractor trailer cab 120 and is approximately 15 inches high, 16 inches wide, and 4 inches deep. A radially expanding pneumatic seal or bladder, such as the PNEUMA-SEAL from Presray Corporation of Pawling, N.Y., is disposed around the perimeter of the supply panel 108. The pneumatic seal is inflated using compressed air from a compressor or a central air line, which is routed through the conduit 106. When inflated, the pneumatic seal expands radially and fills the gap between the outside perimeter of the supply panel 108 and the inside perimeter of the window opening providing a substantially airtight seal. The pneumatic seal conforms generally to the shape of the window; however, in order to fit right angle corners, it is necessary to add at least one intermediate sealing pad. The intermediate sealing pads are bonded to the pneumatic seal at each corner of the supply panel 108 such that each sealing pad mates with a corner of the window to form a substantially airtight seal when the pneumatic seal is inflated. Those skilled in the art will recognize that dimensions of the supply panel will vary depending upon the class of vehicle for which the use is designed. Further, those skilled in the art will recognize that there are unusually shaped and or dimensioned windows which a supply panel dimensioned to fit a standard sized window can not seal. Additional sealing pads are used, as necessary, to fill gaps between the pneumatic seal and the periphery of unusually shaped and or dimensioned windows.

Another embodiment has the supply panel 108 fitted with an adapter that is inserted in a receptacle that is permanently attached to the vehicle 120. The receptacle has a door, which can be closed when the supply panel 108 is not attached to the vehicle 120. The adapter mates with the receptacle and provides an environmental seal and access to the supply panel 108 from the inside of the vehicle 120.

Figure 3:
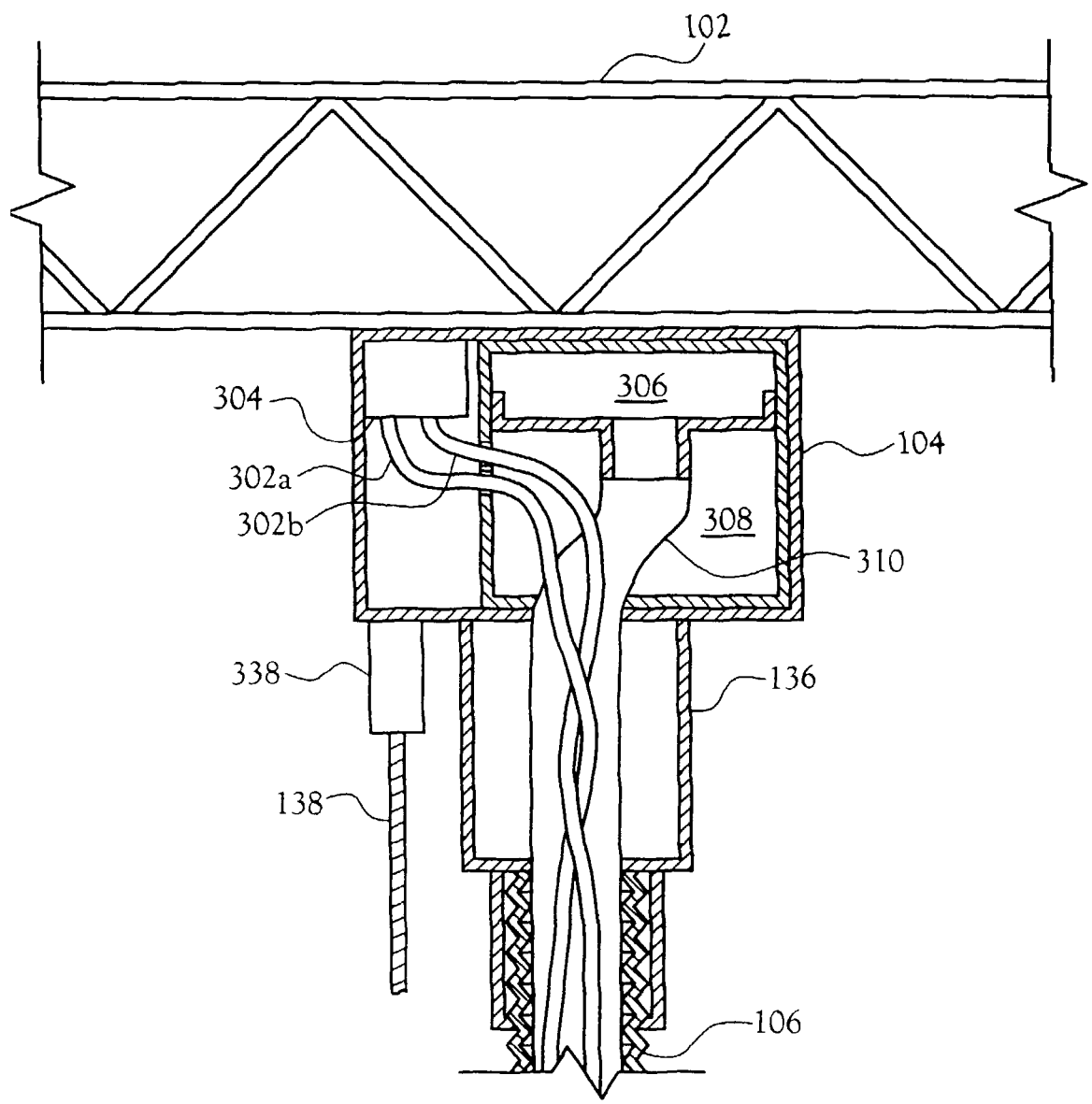
FIG. 3 is section view of the stationary housing.

FIG. 3 shows a section view of the stationary housing 104. The conduit 106 is attached to the stationary housing 104 with a strain relief 136. The conduit 106 may include rigid members (not shown) connected to each other and connected to flexible members. The use of rigid members in combination with shorter flexible members serves to reduce the mount of sag exhibited by the conduit 106. Those skilled in the art will recognize that a variety of conduit configurations could be used to achieve proper positioning of the supply panel without departing from the spirit and scope of the present invention. The conduit 106 contains electrical cables 302a, 302b and an air duct 310. The electrical cables 302 originate from an electrical box 304 and extend through the conduit 106 to the supply panel 108. The cables 302 carry the electrical power, telephone, network, and television and radio signals. Those skilled in the art will recognize that the number of electrical cables can vary without departing from the spirit and scope of the present invention. The electrical box 304 provides a convenient means for interfacing the electrical cables 302 with the services provided from external sources. The cables 302 and air duct 310 are plenum-rated and suitable for use in air ducts.

The air duct 310 is connected to a supply air plenum 306, and the duct 310 carries either heated or cooled air and delivers it to the supply panel 108. The supply air plenum 306 is supplied conditioned air by either a conventional air conditioning unit (not illustrated) contained in the stationary housing 104 or from a central air conditioning unit (not illustrated) that supplies multiple stationary housings 104. The air conditioning unit supplies heated and/or cooled air. The return air from the supply panel 108 passes though the conduit 106 between the inside surface of the conduit 106 and the duct 310. The return air enters a return air plenum 308, and the return air can either be exhausted to the outside atmosphere or it can be recirculated by the air conditioner unit, whether internal to the stationary housing 104 or a central unit.

Figure 4:
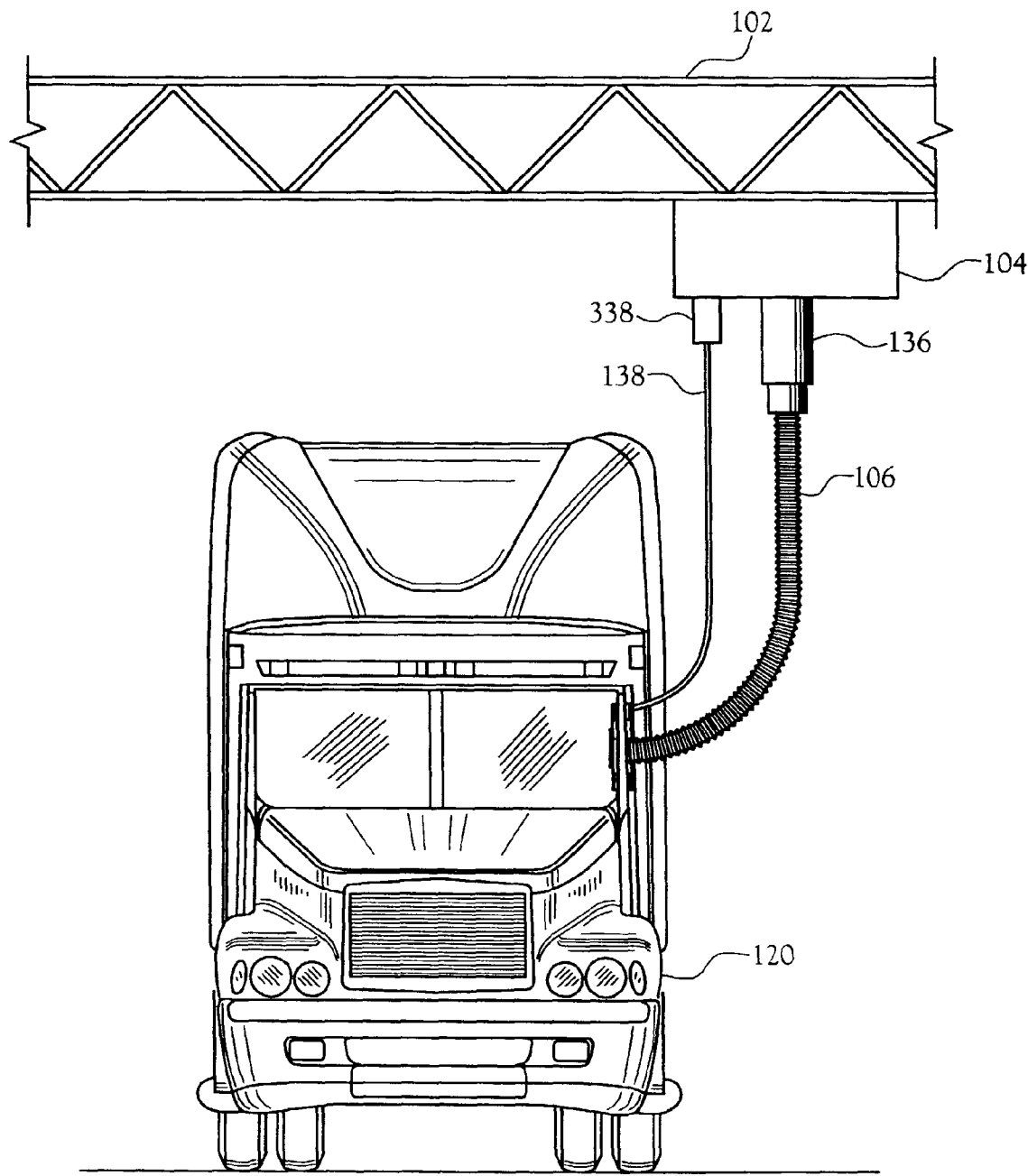
FIG. 4 is a front view of a vehicle and a service module, with the supply panel attached to the vehicle.

FIG. 4 shows a front view of a vehicle 120 with a supply panel 108 attached. The stationary housing 104 is suspended from the overhead gantry 102 with the conduit 106 descending to the supply panel 108. Those skilled in the art will recognize that the weight of supply panel 108 produces some stress on the conduit 106 and its connection to the stationary housing 104 if left hanging freely. One method to reduce this stress is to include a tether or support cable 138 that supports the weight of the supply panel 108. A take-up reel 338 is attached to the stationary housing 104. Descending from the take-up reel 338 is the tether 138 that is attached to and supports the supply panel 108 while it is not being used. In the illustrated embodiment, the tether 138 is shown separate from and external to the conduit 106. Those skilled in the art will recognize that the tether 138 can be included within the conduit 106 itself without departing from the spirit and scope of the present invention. Alternatively, the tether 138 can be a fixed length and support the supply panel 108 at a specified height without the take-up reel 338. Another option is to provide a cradle for receiving the supply panel 108 when not in use. The cradle could be connected to the housing 104 or to the ground. Finally, those skilled in the art will recognize that other methods for eliminating stress on the conduit 106 due to the weight of the supply panel 108 can be used without departing from the spirit and scope of the present invention.

One embodiment of the invention mounts the stationary housing 104 on the ground, either directly or on a pedestal, with the conduit 106 extending from the stationary housing 104. With this configuration, the vehicle 120 can park beside the stationary housing 120 and the supply panel 108 can be attached to the vehicle 120. This configuration has the advantage of permitting two conduits 108, connected to two supply panels 108, to extend from a single stationary housing 104 and service two vehicles 120. A tether or support cable 138 is unnecessary with this embodiment.

Another embodiment mounts the stationary housing 104 on a support at a height that is typically greater than the height of a conventional tractor-trailer 120. By elevating the housing 104, three valuable benefits are achieved. First, there is a substantial savings in real estate as the spacing between parking spaces must only accommodate enough space for the support and not the dimensions of the housing 104. Second by moving the housing 104 above the area occupied by a tractor-trailer 120, the likelihood of incidental damage to the services module 108 is minimized. Finally, aerial mounting of the housing 104 simplifies the construction of the conduit 106 by eliminating the need for structural support and folding joints. This configuration would require the use of a tether or support cable 138. Alternatively, a cradle can receive the supply panel 108 when not in use. Those skilled in the art will recognize that other methods for eliminating stress on the conduit 106 due to the weight of the supply panel 108 can be used without departing from the spirit and scope of the present invention.

In the embodiment illustrated in FIG. 1, a plurality of supply panels 108, each connected to a stationary housing 104 by way of a conduit 106, services a plurality of stationary vehicles 120. Each supply panel 108 communicates with a control system (not shown). The control system includes a local server, which communicates with a plurality of supply panels 106 at a single location, and a central server, which communicates with the local server. The central server maintains a database of information related to the use of each supply panel 106. The database is maintained in real-time and is used to compile billing information. The users of the supply panels 106 (customers) can be billed either immediately after their use is stopped or on a periodic basis, such as daily, weekly, monthly, or some other period. Both the local and central server can monitor usage of the supply panels 106 in order to schedule maintenance, either periodic, preventative, or corrective.

In operation, a stationary vehicle 120 is positioned such that the supply panel 108 can be attached to the stationary vehicle 120. Once the supply panel 108 is attached to the vehicle 120, the vehicle operator uses either the card reader 218 or the operator interface sub-panel 220 to identify either the vehicle operator or the billing entity and to specify the services desired. If the card reader 218 is used, the operator inserts an identifying card into the reader 218, which in turn communicates with the control system. If the operator interface sub-panel 220 is used, the operator enters codes and/or other identifying information with the keypad 224. The operator interface sub-panel 220 communicates with the control system. After the operator is identified by the control system, the operator either has access to a pre-determined assortment of convenience services or the operator can select the convenience services desired to be used. Selection of desired convenience services is by way of the operator interface sub-panel 220. The control system enables the desired convenience services, controls the convenience services that require control, tracks the use of convenience services provided, and compiles billing information.

When the operator wishes to discontinue use of the convenience services, the operator establishes communications with the control system, either through the card reader 218 or the operator interface sub-panel 220. The vehicle operator then disengages the supply panel 108 from the stationary vehicle 120. The vehicle 120 can then leave the area of the supply panel 108, permitting another vehicle to position itself so that the new vehicle can access the supply panel 108.

From the forgoing description, it will be recognized by those skilled in the art that an apparatus for providing convenience services to a stationary vehicle independent of the vehicle electrical system has been provided. The services module includes a positionable conduit to allow a supply panel to be positioned so as to be used by a stationary vehicle. The supply panel is configured to fit within the window or other opening of the stationary vehicle, and forms a substantially airtight seal necessary for climate control. Disposed upon the surface of the supply panel are the connectors, controls, and vents for the services.

While several embodiments of the present invention have been described and while some embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

Having thus described the aforementioned invention, we claim:

1. A service unit for providing a convenience service to a cab of a tractor trailer, comprising;
   a housing;
   a supply panel coupled to said housing and operable to attach to a cab of a tractor trailer, said supply panel providing conditioned air to said cab and providing at least one convenience service selected from the group consisting of radio signals, electrical power, telephone, computer network and video;
   an interactive control configured to activate said service unit, to generate a signal initiated by a user to terminate usage of said service unit, and to electronically obtain payment for prior use of said service unit based on time of usage of said service unit; and
   a display configured to provide information to an operator of said service unit.

2. The service unit of claim 1 wherein said housing contains an air conditioning unit.

3. The service unit of claim 1 further comprising means for attaching said supply panel to an opening in said cab.

4. The service unit of claim 3 further comprising a template,
   said template disposed around said supply panel and dimensioned to substantially fit an opening in said cab.

5. The service unit of claim 4 further comprising a gasket for forming a substantially airtight seal between said opening and said template.

6. The service unit of claim 4 wherein said opening is a window in said cab.

7. The service unit of claim 1 further comprising a gasket being a pneumatic seal disposed around said panel perimeter, said pneumatic seal being inflatable to form an airtight seal with the said cab, wherein said supply panel is dimensioned to substantially fit a window of said cab and defining a perimeter.

8. The service unit of claim 1 further comprising a support for mounting said housing at a preselected height.

9. The service unit of claim 8 further comprising a weight supporting member for supporting said supply panel when said supply panel is not in use.

10. The service unit of claim 9 wherein said weight supporting member is a tether between said housing and said supply panel.

11. The service unit of claim 9 wherein said weight supporting member is a cradle for receiving said supply panel, said cradle located such that said conduit does not support said supply panel when said supply panel is not in use.

12. The service unit claimed in claim 1 wherein a plurality of said service units are supported in a gantry extending across a plurality of tractor trailers.

13. The service unit claimed in claim 1 wherein said interactive control is mounted in said supply panel whereby said service unit can be activated by an operator within said cab.

14. The service unit claimed in claim 1 wherein said supply panel provides heated air, cooled air, alternating current electricity and telephone connection.

15. The service unit claimed in claim 1 wherein said housing recirculates air from within said cab through said supply panel.

16. The service unit of claim 1 further comprising a conduit operable to couple said housing and said supply panel.

17. The service unit of claim 16 wherein said conduit contains at least one air duct and at least one cable.

18. The service unit of claim 17 wherein said at least one air duct and said at least one cable are plenum-rated.

19. The service unit of claim 16 wherein said conduit is a flexible conduit.

20. A service unit for providing a convenience service to a cab of a tractor trailer, comprising:
- a housing;
- a supply panel coupled to said housing and operable to attach to a cab of a tractor trailer;
- wherein said supply panel provides conditioned air to said cab and having at least one interface selected from the group consisting of telephone, computer network and video;
- an interactive control operable to activate said service unit, to generate a signal initiated by a user to terminate usage of said service unit, and to electronically obtain payment for prior use of said service unit based on time of usage of said service unit; and
- a display configured to provide information to an operator of said service unit.

21. A service unit for providing a convenience service to a cab of a tractor trailer, comprising:
- a housing;
- a supply panel coupled to said housing and operable to attach to a cab of a tractor trailer, said supply panel providing conditioned air to said cab;
- an interactive control operable to activate said service unit so as to provide conditioned air to said cab, to generate a signal initiated by a user to terminate usage of said service unit, and to electronically obtain payment for prior use of said service unit based on time of usage of said service unit; and
- a display configured to provide information to an operator of said service unit.

22. The service unit of claim 21 wherein said supply panel provides heated air to said cab.

23. The service unit of claim 21 wherein said supply panel provides cooled air to said cab.

24. The service unit of claim 21 wherein said housing circulates air from within said cab through said supply panel.

25. A service unit for providing a convenience service to a cab of a tractor trailer, comprising;
- a housing;
- a supply panel coupled to said housing and operable to attach to a cab of a tractor trailer, said supply panel providing at least one convenience service selected from the group consisting of radio signals, electrical power, telephone, computer network and video;
- an interactive control operable to activate said service unit, to generate a signal initiated by a user to terminate usage of said service unit, and to electronically obtain payment for prior use of said service unit based on time of usage of said service unit; and
- a display configured to provide information to an operator of said service unit.

* * * * *